United States Patent Office 3,109,727
Patented Nov. 5, 1963

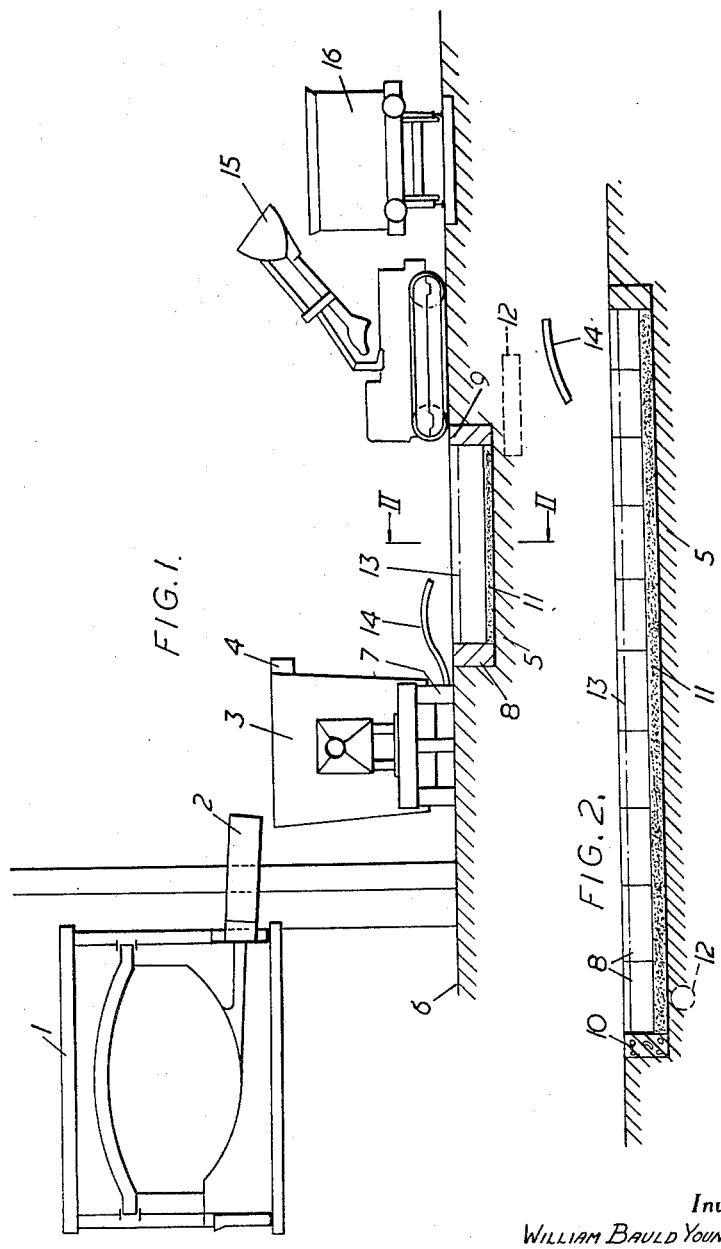

3,109,727
METHOD OF PRODUCING SLAG IN FRAGMENTED FORM
William Bauld Young Miller, Glasgow, Scotland, assignor to Colvilles Limited, Glasgow, Scotland, a British company
Filed Mar. 31, 1958, Ser. No. 725,137
Claims priority, application Great Britain Apr. 23, 1957
2 Claims. (Cl. 65—19)

This invention relates to a method of producing slag in fragmented or particulate form.

Slag from various steel or iron making processes is used for a variety of purposes, for example for road surfacing material, for feeding to blast furnaces for recovery of metal, or for fertilizers. In each case it is necessary that the slag be reduced to particulate size for convenient handling and processing. Such size may be for example suitable for passing a 2 inch or 4 inch mesh.

A number of methods are utilized at present to produce the slag to this marketable size and they involve considerable expenditure of time and labor. For example in one case in a steelworks the slag is run from the steel ladle into Dewhurst ladles each of which holds about ten tons of molten slag and which are mounted on rails and are, when full, taken away from the steelworks and tipped on to a slag hill while the slag is still liquid; then the slag has to be left to cool and solidify, and it has then to be broken down to an appropriate particulate or fragment size. Usually two or three Dewhurst ladles are necessary to deal with the slag from one furnace. This involves the provision of a railway, a locomotive for shunting and tipping, and attendance of a squad of men over a considerable length of time for the handling of the molten slag, coupling to the locomotive, and thereafter for breaking of the cooled and solidified slag into particulate form.

In another method the slag is poured into a cascade of small tubs in which it is allowed to solidify, and these tubs are then taken to the slag hill and the slag is removed by one of a variety of methods and then has to be broken up into particulate or fragmentary form. This likewise involves a considerable amount of labor and time.

An object of the invention is to provide for the speedy conversion of molten slag into solid, conveniently handled fragments.

Another object of the invention is to provide for the safe conversion of molten slag into solid, nonporous fragments of the desired size, water being used in the conversion which is effected within the steelwork or ironwork.

Another object of the invention is to provide for the substantially continuous production in a steelwork and with a minimum of equipment, of open-hearth or Bessemer furnace slag in the form of easily-handled solid fragments substantially devoid of blow-holes.

In accordance with the present invention there is provided a method of producing slag in fragmented or particulate form for handling and marketing, comprising pouring the slag to form a pool, spraying the slag pool with water to cause the slag to cool and then allowing further cooling of the slag which effects fragmentation of the slag pool in situ.

In this way the process is greatly simplified and use of labor and expenditure of time is much reduced.

A method embodying the invention will now be described, but merely by way of example, with reference to the accompanying drawing in which FIG. 1 is a transverse schematic view of the apparatus and equipment for carrying out the method, and FIG. 2 is a longitudinal sectional view on the line II—II of FIG. 1.

Referring to the drawing:

In a steelwork, an open-hearth furnace 1 has a tapping trough 2 discharging into a steel ladle 3. The slag is run off the top of the steel ladle 3 before pouring the metal, being run through a spout 4 into a preformed earth pit 5 in the casting floor 6 of the works.

A typical slag produced in the manufacture of ordinary mild steel consists of:

| | Percent |
|---|---|
| Lime | 48.7 |
| $P_2O_5$ | 5.82 |
| FeO | 12.6 |
| Silica or insoluble | 13.49 |

Silicates of phosphorus and lime exist in the slag, and when red or white hot they cause a violent explosion if deposited on water. It follows that extreme care is necessary in carrying out the following cooling technique which involves the use of water.

The pre-formed pit 5 is formed in the soil adjacent to the steel ladle support 7 and is made about 7 feet wide, that is, just sufficient to allow passage of a mechanical shovel 15. The longitudinal sides of the pit are shored or strengthened by old mold bottoms 8 and 9 of thick cast iron which form a lining for these sides of the pit and retain them against collapsing when the mechanical shovel is used as hereinafter explained. The pit is about one foot deep and about 30 feet long. The floor of the pit slopes slightly downwards longitudinally towards a transverse concrete retaining wall 10 shoring an end wall of the pit. A layer 11 of fairly fine slag particles, about 6 inches thick, lines the pit floor and forms a porous base which facilitates drainage of excess water from the pit floor. A lateral drainage pipe 12 opens from below the pit floor near the lower end of the pit to drain off any water collecting at the lower end.

The slag is run off the top of the steel ladle 3, through the spout 4, directly into this pit 5 before the metal is poured from the ladle. The molten slag 13 is allowed to cool for about twenty minutes. The molten slag 13 in the pit 5 is then sprayed with a water hose 14 intermittently for two to three hours. The initial cooling period of about twenty minutes allows for consolidation of the layer of slag and ensures that on application of the water (a) there is no violent emission of steam and (b) no blow-holes are formed in the layer so that the formation of an undesirable sponge-like structure in the layer, giving easily crumbled granules, is avoided.

The steel ladle 3 is removed from its support 7 and emptied during the initial slag-cooling period.

The gradual application of water to the layer by intermittent spraying is important. Thus, continuous spraying with water would tend to cause undesirable softening of the slag due to the hydrolysis of its lime-bearing constituents. Moreover, the excess water supplied by continuous spraying would sink to the floor of the pit. While the drainage system would remove most of the water, the floor would remain wet after removal of the fragmented slag, and if molten slag is poured on to a wet floor there is serious risk of a dangerous explosion. However, it is necessary to apply sufficient water to cool the slag, and if too fine a spray is used the water particles may be caused to vaporize before contacting the slag and may not be properly effective. It is therefore preferred to use a relatively low speed solid jet or stream of water.

To obtain gradual and positive chilling of the slag without using an excess of water, the spray or jet is operated until the surface of the slag layer is slightly flooded, whereupon spraying is stopped until the water has evaporated and the surface of the layer has become dry and greyish. In this way substantially all of the cooling water is vaporized.

After spraying, the slag is allowed to cool for a final period of say three hours. This final cooling period permits the internal stresses in the layer, generated by the previous cooling steps, to effect gradual fragmentation of the layer.

Surprisingly, the slag fragments formed are of substantially uniform size. The size may be such as to pass say a 2 inch or 4 inch mesh. The size may be varied by varying the depth of the molten slag layer in the pit. This depth may vary between about 1 foot and 1.5 ft., and the greater the depth the larger the fragments formed on cooling.

The fragmented slag is removed from the pit 5 quite easily by a mechanical shovel 15, whcih can shovel the fragments up directly into a railway wagon 16 for removal for marketing purposes or possibly for finer grinding for specialized purposes, for example for fertilizers.

A pit may be formed alongside each furnace in the works. Thus, the invention enables the continuous production of slag in the form of solid fragments, without the need for moving the molten slag from the casting floor of the works and without the need for manual or mechanical fragmentation of a solid body of cooled slag. Moreover, the carefully controlled cooling ensures the production of hard fragments of substantially uniform size and substantially free from blow-holes, as required for, say, road-surfacing, brickmaking, or grinding to form fertilizer.

Any metal which over-runs the steel ladle during pouring of the slag falls into the slag pit with the slag and forms thin metal sheets on the bottom of the pit. Following removal of the slag fragments from the pit, said metal sheets are easily detached from the pit floor and may be gas-cut in the pit and sent direct to the steel furnace for remelting.

The foregoing method of metal recovery is made possible by the present invention and is much easier to carry out than a usual method which involves separation of metal lumps from the bottom of a Dewhurst ladle.

I claim:

1. A method for the production of hard slag fragments of substantially uniform size and substantially free from blow-holes, comprising the steps of pouring molten slag into a preformed shallow pit to form a shallow molten slag pool, the length and width of said pool being many times the depth thereof, permitting said molten slag to cool for a brief period of time, flooding the surface of the slag with water, stopping the flooding to permit the heat of the slag to vaporize the water and cool the slag, intermittently continuing flooding of the slag with water for a perid of several hours, and then permitting the slag to cool for a period of several additional hours to effect the fragmentation thereof in situ.

2. The method of claim 1 wherein the slag size is within the range of about 2 to about 4 inch mesh, the pool measures about 7 feet in width by about 30 feet in length and the depth lies within the range of about 1 to about 1.5 feet, the initial brief period of time being about 20 minutes, the intermittent flooding continuing for about 2 to about 3 hours and the cooling after flooding taking place in about 2 to about 3 hours.

References Cited in the file of this patent
UNITED STATES PATENTS

| | | |
|---|---|---|
| 810,864 | Hoover et al. | Jan. 23, 1906 |
| 810,865 | Hoover et al. | Jan. 23, 1906 |
| 887,188 | Burn | May 12, 1908 |
| 959,720 | Croxton | May 31, 1910 |
| 1,058,158 | Danforth | Apr. 8, 1913 |
| 1,071,605 | Danforth | Aug. 26, 1913 |
| 1,224,815 | Walters | May 1, 1917 |
| 1,803,886 | Ausman | May 5, 1931 |
| 1,849,090 | Hunsaker | Mar. 15, 1932 |
| 2,023,511 | Brosius | Dec. 10, 1935 |
| 2,443,103 | Gallai-Hatchard | June 8, 1948 |
| 2,460,742 | Gallai-Hatchard | Feb. 1, 1949 |
| 2,700,849 | Klotzbach | Feb. 1, 1955 |
| 2,716,843 | Stuart | Sept. 6, 1955 |